United States Patent
Jung et al.

(10) Patent No.: US 7,016,008 B2
(45) Date of Patent: Mar. 21, 2006

(54) METHOD OF FABRICATING LIQUID CRYSTAL DISPLAY DEVICE HAVING SEALANT PATTERNS, DUMMY PATTERNS, AND SUBSTRATE PROTECTIVE PATTERNS

(75) Inventors: Tae Yong Jung, Taegu-Kwangyokshi (KR); Sung Gu Kang, Kyongsangbuk-do (KR); Jae Young Jeon, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 119 days.

(21) Appl. No.: 10/310,847

(22) Filed: Dec. 6, 2002

(65) Prior Publication Data

US 2003/0160931 A1    Aug. 28, 2003

(30) Foreign Application Priority Data

Dec. 18, 2001   (KR) ............................... 2001-80782

(51) Int. Cl.
*G02F 1/1339*   (2006.01)
(52) U.S. Cl. ........................ 349/153; 349/187
(58) Field of Classification Search .............. 349/187, 349/190, 106, 153, 110, 155
See application file for complete search history.

(56) References Cited

U.S. PATENT DOCUMENTS

| | | | |
|---|---|---|---|
| 5,361,152 A * | 11/1994 | Harada et al. ............... | 349/188 |
| 5,410,423 A * | 4/1995 | Furushima et al. .......... | 349/190 |
| 5,766,493 A | 6/1998 | Shin | |
| 5,835,176 A | 11/1998 | Jeong et al. | |
| 6,197,209 B1 | 3/2001 | Shin et al. | |
| 6,400,439 B1 * | 6/2002 | Fujioka et al. ............... | 349/153 |
| 6,552,769 B1 * | 4/2003 | Cho et al. .................... | 349/153 |
| 6,573,968 B1 * | 6/2003 | Jeong .......................... | 349/153 |

FOREIGN PATENT DOCUMENTS

| | | | |
|---|---|---|---|
| JP | 2138459 | 5/1990 | |
| JP | 3022390 | 1/1991 | |
| JP | 4116619 | 4/1992 | |
| JP | 5249422 | 9/1993 | |
| JP | 5249423 | 9/1993 | |
| JP | 7168172 | 7/1995 | |
| JP | 2000-258782 | * 9/2000 | |

* cited by examiner

*Primary Examiner*—Andrew Schechter
*Assistant Examiner*—Thoi V. Duong
(74) *Attorney, Agent, or Firm*—McKenna Long & Aldridge LLP

(57) ABSTRACT

A method of fabricating a liquid crystal display which prevents breakage of a substrate in a thin liquid crystal display panel. The method includes forming a plurality of sealant patterns defining a liquid layer on a first substrate, a plurality of dummy patterns between the sealant patterns, and a plurality of protective patterns on crossings between the dummy patterns; bonding a second substrate to the first substrate, forming a plurality of scribing lines on a surface of either the first or second substrate; and cutting the first and second substrates along the scribing lines.

20 Claims, 5 Drawing Sheets

METHOD OF FABRICATING LIQUID CRYSTAL DISPLAY DEVICE HAVING SEALANT PATTERNS, DUMMY PATTERNS, AND SUBSTRATE PROTECTIVE PATTERNS

This application claims the benefit of the Korean Application No. P2001-80782 filed on Dec. 18, 2001, which is hereby incorporated by reference.

BACKGROUND OF THE INVENTION

1. Field of the Invention

The present invention relates to a method of fabricating a liquid crystal display device that prevents breakage of a substrate during a scribing process.

2. Discussion of the Related Art

A liquid crystal display (LCD), which has advantages including a high contrast ratio and low power consumption, and which is suitable for gray scale or moving picture displays, has become a substitute for a cathode ray tubes (CRTs) so as to overcome the disadvantages associated with cathode ray tubes.

Generally, such a liquid crystal display device includes a thin film transistor substrate having thin film transistors and pixel electrodes formed in pixel areas defined by gate and data lines, respectively; a color filter substrate having a color filter layer and a common electrode formed thereon; and a liquid crystal layer formed between the two substrates. The liquid crystal display device receives various external signals so as to display an image.

Recently, a thin and lightweight device has been developed for liquid crystal panel applications such as mobile phones, personal digital assistants (PDAs), and notebook computers.

There are various methods for reducing the weight of the liquid crystal display device. It is most preferable that a large-sized glass substrate, which is the heaviest component of the liquid crystal display device, is thinned to reduce the weight of the LCD device.

A method of fabricating a liquid crystal display device according to a related art is explained in reference to the drawings as follows.

FIG. 1 illustrates a flowchart of a method of fabricating a liquid crystal display device according to a related art. FIG. 2 illustrates a layout of a liquid crystal display device according to a related art. FIG. 3 illustrates a method for forming sealing patterns according to the related art.

Referring to FIG. 1, a thin film transistor substrate having thin film transistors and pixel electrodes formed in pixel areas defined by gate and data lines, respectively and a color filter substrate having a color filter layer and a common electrode formed thereon are provided in (S1).

A sealant 14 in FIG. 2 is formed on the thin film transistor or color filter substrate so as to be an adhesive agent between the thin film transistor and color filter substrate. Spacers are scattered on the thin film transistor or color filter substrate so as to maintain a uniform interval between the two substrates. The thin film transistor and color filter subtrates are then bonded to each other so as to face each other (S2).

The sealant 14, as shown in FIG. 2 is formed at circumferences of effective display areas that will display an image, respectively, thereby forming a cell gap as well as preventing leakage of liquid crystals.

Dummy patterns 15 are formed simultaneously when the sealant 14 is formed. The dummy patterns 15 are formed between the sealant 14 in parallel with a scribing line, which will be formed later, so as to absorb shocks generated from scribing/breaking processes.

Specifically, the sealant 14 and the dummy patterns 15 are formed by a process such screen printing using an adhesive agent mixed with micro-pearls and the like.

In FIG. 3, a screen mask 51 is placed on a substrate 52. An adhesive agent 53 is dropped on the screen mask 51. Then the adhesive agent 53 is pushed in one direction by a squeegee 54. Thus, the adhesive agent is printed on the substrate 52 through an opening 51a of the screen mask 51 so as to form each of the sealant 14.

After the sealant 14 has been formed, the other substrate is bonded to the substrate 52 so as to face each other. Hot pressure is applied to the two substrates so as to harden the sealant, whereby the two substrates are fully bonded to each other.

Subsequently, surfaces of the substrates are etched so as to thin the device (S3).

In accordance with the trend of thinning the device, substrate etching techniques for decreasing the thickness of the substrate are available. In order to decrease the thickness of the substrate, an outer surface of the substrate is grinded or a glass substrate is dipped in an etching container filled with an etchant solution so that a surface of the substrate is etched.

The latter method of etching the substrate is carried out in a manner that a liquid crystal display panel prepared by bonding substrates to each other is dipped in an etching container filled with HF. Hence, outer surfaces of the substrates are etched uniformly.

In order to cut the substrates into designated sizes, successively scribing lines 18 in FIG. 2 are formed on a surface of the color filter or thin film transistor substrate using a scribing wheel having constant pressure and speed.

After the scribing lines have been formed, force is directly applied along the scribing lines using a break bar so as to separate the liquid crystal display panel. In this case, caution should be used so that the force is not concentrated on a local position (S4).

After the scribing/breaking processes, a physical process using an air blower is carried out so as to remove the debris from the liquid crystal display panel.

The number of times that scribing/breaking is used to separate the small-sized LCD panel is greater than that of a general or large-sized LCD panel, and the strength of the small-sized LCD panel is weaker than that of the general or large-sized LCD panel. Hence, the substrate is broken with ease. Specifically, such a problem occurs severely at an intersection "A" in FIG. 2 between the scribing lines.

Subsequently, a liquid crystal layer is formed between the two substrates (S5), and cut faces and edges of the liquid crystal display panel are grinded using an abrasive grindstone having a predetermined mesh (S6).

The liquid crystal layer is formed by providing a vacuum state inside the liquid crystal cell and injecting liquid crystals between the two substrates using capillary action.

Finally, a cleaning process is carried out so as to remove the liquid crystals, particles, and substrate debris adhered to an outer surface of the panel. Then a failure of the panel is determined by inspecting an exterior of the panel or applying an electric signal thereto.

Thereafter, a module assembly is carried out in such a manner that a polarizing plate is attached to the outer surface of the liquid crystal display panel, an external driving circuit is connected thereto, and a backlight used as a light source is installed for a transmissive or semi-transmissive type device. Thus, the fabrication of liquid crystal display device is completed (S7).

Unfortunately, the above-explained liquid crystal display device according to the related art has the following problems.

If the liquid crystal display panel is a small and thin, the number of scribing process increases as the panel size decreases. As a result, the strength of the substrate, which is thinned, becomes weak, whereby the substrate is vulnerable to breakage along the scribing lines when the substrate is transported after the scribing process or the breaking process is carried out on the substrate.

Moreover, the above-problems are associated with the general LCD panel as well.

SUMMARY OF THE INVENTION

Accordingly, the present invention is directed to a method of fabricating a liquid crystal display device that substantially obviates one or more problems due to limitations and disadvantages of the related art.

An advantage of the present invention is to provide a method of fabricating a liquid crystal display device that prevents breakage of a substrate doing a scribing/breaking process.

Additional features and advantages of the invention will be set forth in part in the description which follows, and in part will be apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, a method of fabricating a liquid crystal display device according to the present invention includes forming a sealant on a first substrate, a plurality of dummy patterns between the sealant, and a plurality of substrate protective patterns on crossings between the dummy patterns; bonding a second substrate to the first substrate; forming a plurality of scribing lines on a surface of one of the first and second substrates; and cutting the first and second substrates along the scribing lines.

The sealant, dummy, and substrate protective patterns may be formed simultaneously.

The substrate protective patterns are formed at intersections of the scribing lines.

The sealant, dummy, and substrate protective patterns may be formed by photo-hardening resin or thermo-hardening resin.

The sealant, dummy, and substrate protective patterns may have substantially the same height.

The method further includes hardening the sealant, dummy, and substrate protective patterns after bonding the first and second substrates.

In another aspect of the present invention, a method of fabricating a liquid crystal display device includes forming a plurality of pixel electrodes and thin film transistors on a first substrate; forming a plurality of color filter layers and common electrodes on a second substrate; forming spacers on the first substrate; forming sealant and dummy and substrate protective patterns on the second substrate; bonding the first and second substrates; forming a plurality of scribing lines on a surface of one of the first and second substrates, the substrate protective patterns being formed at intersections of the scribing lines; and cutting the first and second substrates along the scribing lines.

The sealant, dummy, and substrate protective patterns are formed of thermo-hardening resin.

The sealant, dummy, and substrate protective patterns are formed of photo-hardening resin.

The sealant, dummy, and substrate protective patterns are substantially the same height.

The method further includes hardening the sealant, dummy, and substrate protective patterns after bonding the first and second substrates and etching outer surfaces of the first and second substrates.

The characteristics of the present invention are required for small-sized thin liquid crystal display panels as well as large-sized thin liquid crystal display panels.

Hereinafter, a sealant pattern at a crossing between scribing lines is referred to as a substrate protective pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of present invention, example of which is illustrated in the accompanying drawings. Wherever possible, the same reference numbers will be used throughout the drawings to refer to the same or like parts.

Figure 1:
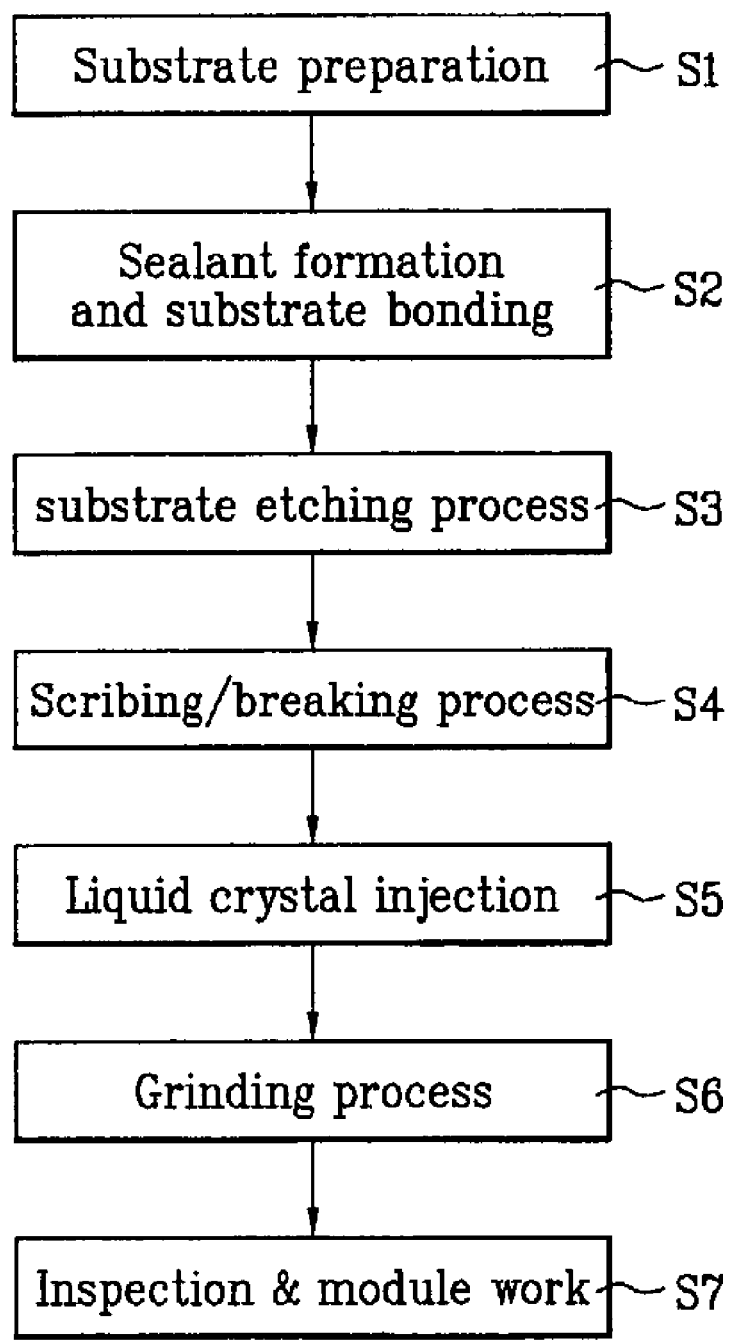
FIG. 1 illustrates a flowchart of a method of fabricating a liquid crystal display device according to a related art.
Figure 2:
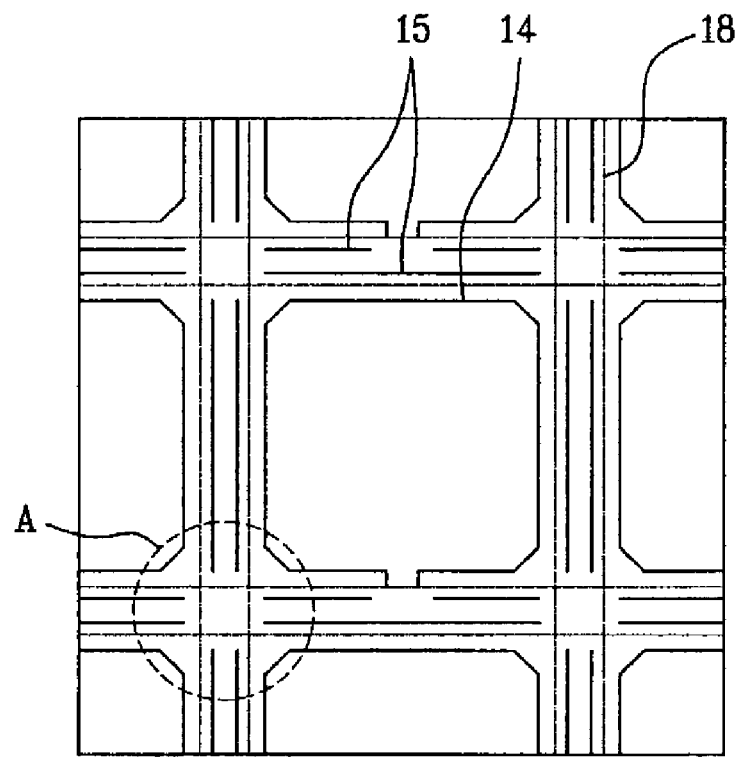
FIG. 2 illustrates a layout of a liquid crystal display device according to a related art.
Figure 3:
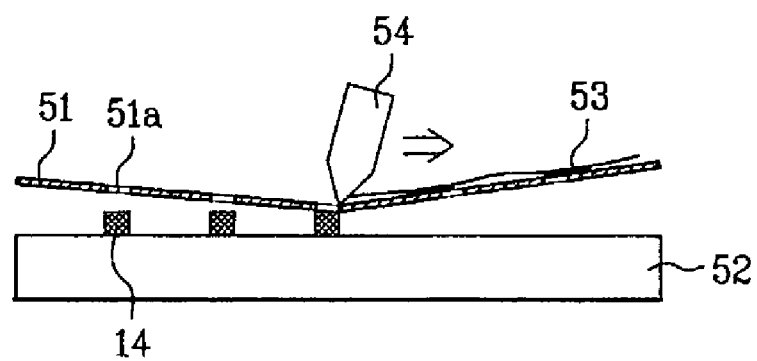
FIG. 3 illustrates a cross-sectional view for explaining a method of forming sealant patterns.
Figure 4:
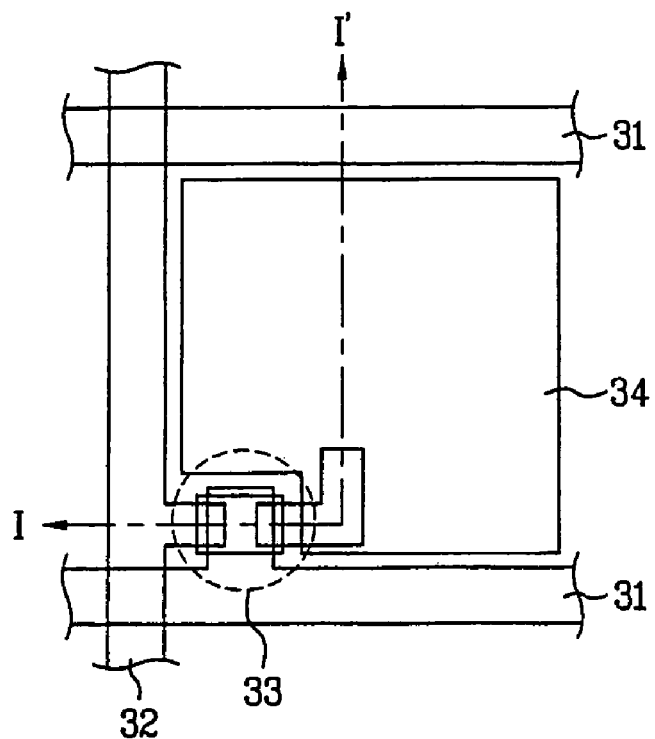
FIG. 4 illustrates a plan view of a liquid crystal display device according to the present invention.
Figure 5:
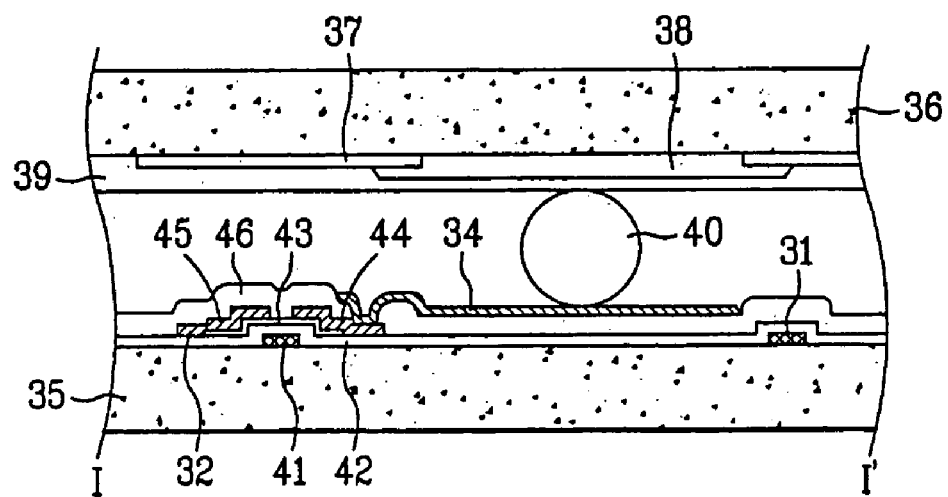
FIG. 5 illustrates a cross-sectional view along a cutting line I–I' of FIG. 4.

FIG. 4 and FIG. 5 illustrate a plan view and a cross-sectional view of a liquid crystal display device according to the present invention.

A method of fabricating a liquid crystal display device according to the present invention includes forming scan lines 31 transferring scan signals and signal lines 32 transferring video signals on a first substrate 35 to cross with each other so as to define a plurality of pixel areas; and forming thin film transistors and pixel electrodes 34 in the pixel areas, respectively. Each of the thin film transistors has a gate electrode 41, a semiconductor layer 43, and source/drain electrodes 45, 44 respectively.

A black matrix 37 is formed on a second substrate 36 so as to prevent light leakage from an area unable to control liquid crystals. A color filter layer 38 which is colored with R, G, and B is formed on the black matrix 37 using one of dyeing, electro deposition, pigment dispersion, coating, and the like. A common electrode 39 is formed on an entire surface including the color filter layer 38 so as to confront the pixel electrodes 34.

Figure 6A:
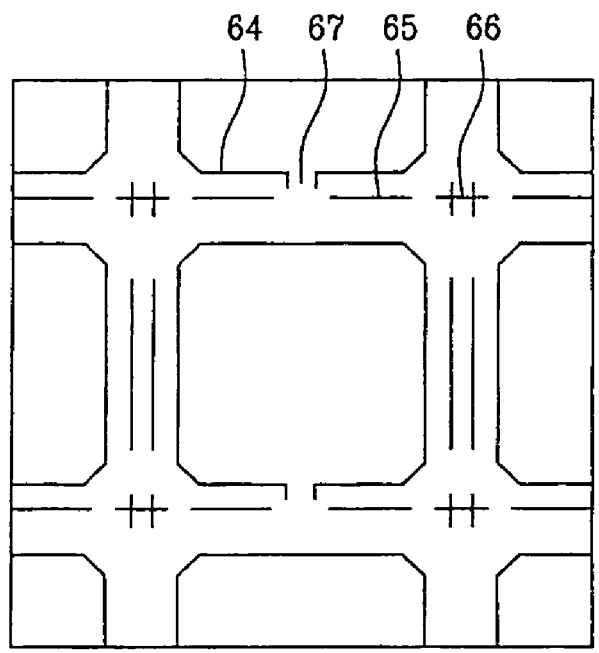
FIG. 6A and FIG. 6B illustrate layouts of a liquid crystal display device according to the present invention.

Subsequently, in order to maintain a thickness of a liquid crystal layer, i.e. a gap between the first and second substrates, uniform spacers 40 are scattered on an entire surface of the first substrate having the patterns formed thereon. As shown in FIG. 6A, and sealant patterns 64 are formed at peripheries of active areas of the second substrate, respectively. In this case, the sealant pattern fails to be formed at a liquid crystal injection inlet 67.

Figure 6B:
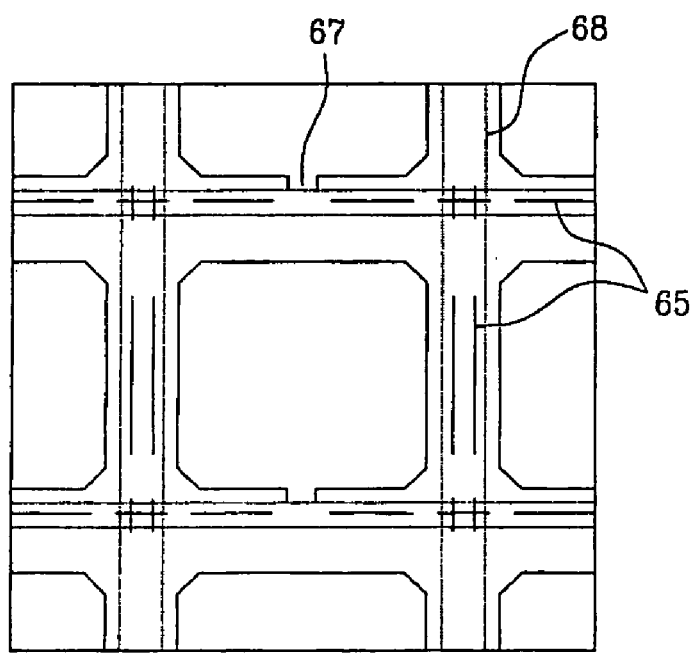

On the contrary, the spacers 40 can be scattered on the second substrate 36, and the sealant patterns 64 can be formed on the first substrate 35, as shown in FIG. 6A and FIG. 6B.

Moreover, dummy patterns 65 and substrate protective patterns 66 are formed simultaneously with the sealant patterns 64 so as to have substantially the same height.

The sealant patterns 64 prevent leakage of liquid crystals as well as maintain a cell gap at the peripheries of the active areas similar to the cell gap uniformly provided by the spacers in the active area.

The dummy patterns 65 are formed in parallel with scribing lines 68 in FIG. 6B that will be formed later so as to absorb shock generated from the scribing/breaking process. Therefore, the dummy patterns 65 maintain the substrate cell gap.

The substrate protective patterns 66 are formed at the crossings between the scribing lines on which shocks are concentrated when the scribing/breaking process is carried out, respectively, thereby enhancing support points to prevent the breakage of the substrate. The substrate protective patterns 66 are formed in a direction substantially vertical to the scribing lines. The substrate protective patterns 66 may have a cross-shape.

In order to form the substrate protective patterns 66 at the crossings between the scribing lines, the substrate protective patterns 66 are formed at areas where extending lines of the dummy patterns 65 cross with each other when the sealant and dummy patterns 64 and 65 are formed.

The sealant, dummy, and substrate protective patterns 64, 65, and 66 are formed of polymer having excellent adhesiveness such as epoxy resin by one of screen printing, dispensing, and the like. Thermo-hardening or photo-hardening resin is also available for the patterns.

After the sealant patterns 64 have been formed, the first and second substrates are bonded to face each other. High pressure and heat or light are applied to the bonded substrates to harden the sealant patterns, whereby the two substrates are completely bonded to each other.

Air inside the liquid crystal cell is discharged outside when the pressure is applied thereto. Since the dummy and substrate protective patterns 65 and 66 are patterned so as not to intervene with the flow of air, there is no chance that the cell gap becomes irregular when the air is discharged.

Meanwhile, an outer surface of the substrate is etched or thinned to form the liquid crystal display device. There are various methods of etching the substrate surface. A method of dipping the liquid crystal display panel in an etching container filled with HF is mainly used for etching the substrate.

In order to cut the two bonded substrates into required sizes, a scribing process for forming scribing lines 68 on a surface of the first or second substrate of the liquid crystal display panel is carried out using a scribing wheel.

In this case, the scribing lines 68 are formed in parallel between the sealant and the dummy patterns 64 and 65. If the substrate is a glass substrate, the scribing lines 68 are formed on the surface of the glass substrate using a blade made of a material such as diamond or tungsten having a hardness greater than that of glass.

Then, direct shock is impacted on the first or second substrate along the scribing lines 68 using a break bar, thereby cutting the liquid crystal display panel.

As mentioned in the above explanation, liquid crystals are injected between the two substrates through the liquid crystal injection inlet 67, and the liquid crystal injection inlet 67 is sealed so as to complete the liquid crystal display panel having the required size. Instead of a general injecting method, the formation of the liquid crystal layer can be achieved by a liquid crystal dropping method of dropping liquid crystals on one of the substrates before the bonding process.

Finally, cut faces and edges of the liquid crystal display panel of the scribing/breaking processes are grinded using an abrasive grindstone having a predetermined mesh.

Figure 7:
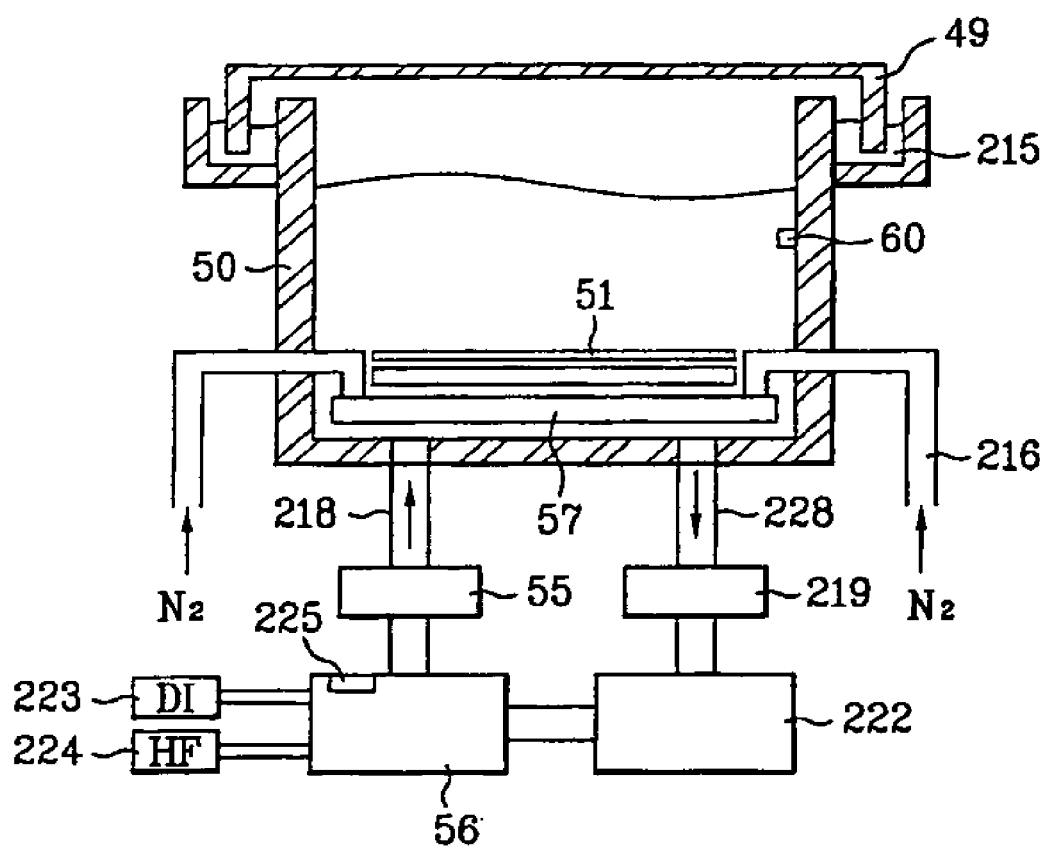
FIG. 7 illustrates a cross-sectional view of an etching apparatus used for etching a substrate.

FIG. 7 illustrates a cross-sectional view of an etching apparatus used for etching a substrate.

Referring to FIG. 7, an etching apparatus according to the present invention includes an etching container 50, a cover 49 installed over the etching container 50 so as to be sealed to the etching container 50 through a water sealant 215, a bubble plate 57 installed inside the etching container 50, gas supply pipes 216 installed at the sides of the bubble plate 57 so as to supply $N_2$ or $O_2$ from a gas supply unit (not shown in the drawing), an etchant supply pipe 218 connected to a bottom of the etching container 50 so as to supply an etchant from an etchant mixing unit 56, an etchant discharge pipe 228 discharging the used etchant outside, and a temperature sensor 60 measuring temperature variation inside the etching container 50.

In this case, the etchant discharged through the etchant discharge pipe 228 is filtered by a filter 219 so that impurities are removed from the etchant solution, and then the etchant is kept in a buffer tank 222. The purified etchant stored in the buffer tank 222 is applied again to the etchant mixing unit 56 so as to be mixed with deionized (DI) water and HF supplied from DI and HF supply units 223 and 224, respectively. On mixing, a concentration of the mixture solution is measured by a concentration measurement device 225 installed in the etchant mixing unit 56. If the concentration reaches a setup value, the supply of DI water and HF is stopped. In this case, a reference concentration is set up within a range of about 1~50%.

Moreover, a coolant pipe (not shown) is further installed inside the etchant mixing unit 56 so as to maintain a constant temperature of the mixture solution.

An etching process using the etching apparatus is explained as follows.

First, a glass substrate 51 is loaded on a cassette (not shown in the drawing) of the etching container 50, and then a pump 55 connected to the bottom of the etching container 50 is driven to supply the etchant mixed uniformly from the etchant mixing unit 56.

Once the etchant reaches a predetermined level, an etching process of the substrate is initiated. When a temperature inside the etching container increases, the temperature sensor 60 senses the temperature so as to determine whether to end the etching process.

Namely, since the etching process is an exothermic reaction generating heat from the reaction between the etchant and silicon oxide ($SiO_x$) of the glass substrate, the temperature sensor 60 senses the generated heat.

Therefore, reaction heat in accordance with thickness of each of the substrates constituting the liquid crystal display panel and the number of the substrates is calculated. If the temperature inside the etching container reaches a predetermined degree, the etching process is automatically stopped so as to etch faces of the liquid crystal display panel to a uniform thickness.

The temperature setup is determined by the following formula, whereby the etch process is automatically stopped once a final temperature is attained.

$Tf=Ti+(Kr*N*\Delta t2)/m$, where Tf, Ti, Kr, N, m, and $\Delta t2$ are final temperature, initial temperature, reaction constant, number of substrates, mass of the etching container, and thickness to be etched, respectively.

Using the above method, the apparatus is able to etch the substrate of about 1.4 mm to a thickness of about 0.5 mm. Namely, the thickness of the substrate when bonded becomes about 0.5 mm.

Meanwhile, the bubble plate 57 is further included so as to provide bubbles of oxygen or nitrogen gas supplied inside the etching container 50. The bubbled gas the removal of reactants, which are generated from the reaction between the etchant and the glass substrate, from the surface of the glass substrate with ease so as to perform the etching process.

Thereafter, the liquid crystal display panel etched to a predetermined thickness is cleaned so as to remove HF remaining on the substrate surface completely, and then dried so as to complete a liquid crystal display device.

The above-described method of fabricating the liquid crystal display device according to the present invention has the following advantages and effects.

First, the sealant patterns, i.e. substrate protective patterns, are formed at the crossings of the scribing lines so as to increase the support points. Therefore, the present invention reduces the substrate breakage when the scribing/breaking processes are carried out.

Accordingly, the present invention decreases a failure rate in the scribing/breaking processes of the thin LCD panel which requires a number of scribing processes.

Second, air circulation is not inhibited by the substrate protective patterns, whereby the air inside the liquid crystal cells can be discharged outside with ease in the process of hardening the sealant.

It will be apparent to those skilled in the art that various modifications and variation can be made in the present invention without departing from the spirit or scope of invention. Thus, it is intended that the present invention cover the modifications and variations of this invention provide they come within the scope of the appended claims and their equivalents.

What is claimed is:

1. A method of fabricating a liquid crystal display device, comprising:
    forming sealant patterns on a first substrate, a plurality of dummy patterns between the sealant, and a plurality of substrate protective patterns located where extending lines of the dummy pattern cross;
    bonding a second substrate to the first substrate;
    forming a plurality of scribing lines on a surface of one of the first and second substrates; and
    cutting the first and second substrates along the scribing lines.

2. The method of claim 1, wherein the sealant, dummy, and substrate protective patterns are formed simultaneously.

3. The method of claim 1, wherein the substrate protective patterns are formed at crossings of the scribing lines.

4. The method of claim 1, wherein the sealant, dummy, and substrate protective patterns are formed of thermo-hardening resin.

5. The method of claim 1, wherein the sealant, dummy, and substrate protective patterns are formed of photo-hardening resin.

6. The method of claim 1, wherein the sealant, dummy, and substrate protective patterns have substantially the same height.

7. The method of claim 1, further comprising hardening the sealant, dummy, and substrate protective patterns after bonding the first and second substrates.

8. The method of claim 1, further comprising etching outer surfaces of the first and second substrates after bonding the first and second substrates.

9. The method of claim 1, wherein the substrate protective patterns have a cross-shape.

10. A method of fabricating a liquid crystal display device, comprising:
    forming a plurality of pixel electrodes and thin film transistors on a first substrate;
    forming a plurality of color filter layers and common electrodes on a second substrate;
    forming spacers on the first substrate;
    forming sealant, dummy and substrate protective patterns on the second substrate, wherein the dummy patterns are located between the sealant patterns and the substrate protective patterns are located where extending lines of the dummy patterns cross;
    bonding the first and second substrates;
    forming a plurality of scribing lines on a surface of one of the first and second substrates, wherein the substrate protective patterns are formed at crossings of the scribing lines; and
    cutting the first and second substrates along the scribing lines.

11. The method of claim 10, wherein the sealant, dummy, and substrate protective patterns are formed of thermo-hardening resin.

12. The method of claim 10, wherein the sealant, dummy, and substrate protective patterns are formed of photo-hardening resin.

13. The method of claim 10, wherein the sealant, dummy, and substrate protective patterns have substantially the same height.

14. The method of claim 10, further comprising hardening the sealant, dummy, and substrate protective patterns after bonding the first and second substrates.

15. The method of claim 10, further comprising etching outer surfaces of the first and second substrates after bonding the first and second substrates.

16. The method of claim 10, wherein the substrate protective patterns have a cross-shape.

17. The method of claim 10, wherein the second substrate further includes a black matrix.

18. The method of claim 17, wherein the color filter layers are formed on the black matrix using one of dyeing, electro deposition, pigment dispersion, and coating.

19. The method of claim 10, wherein the spacers are scattered on an entire surface of one of the first substrate and the second substrate.

20. The method of claim 10, wherein the dummy patterns are formed in parallel with the scribing lines.

* * * * *